Patented Nov. 25, 1941

2,263,827

UNITED STATES PATENT OFFICE 2,263,827

INSECT LARVAL LURE

Edouard H. Siegler, Takoma Park, Md., assignor to Henry A. Wallace, as Secretary of Agriculture of the United States of America and his successors in office No Drawing. Application October 13, 1939,
Serial No. 299,263

2 Claims. (Cl. 167—48)

(Granted under the act of March 3, 1883, as
amended April 30, 1928; 370 O. G. 757)

This application is made under the act approved March 3, 1883, as amended by the act of April 30, 1928, and the invention herein described and claimed, if patented, may be manufactured and used by or for the Government of the United States of America for governmental purposes without the payment to me of any royalty thereon.

This invention relates to the activating effect on the feeding by insect larvae on fruit and foliage that has been coated with insecticides as a result of adding certain types of substances to the toxic compounds. Materials such as lead arsenate, calcium arsenate, phenothiazine, tartar emetic and others are not in themselves palatable to insects and, for this reason, the insects seek unpoisoned areas of the host plant for feeding purposes. This habit permits many insects to survive because of the difficulty of thoroughly coating all parts of the host plant with the insecticide.

My invention is not to be confused with lures for adult insects. It is directed primarily to the larval forms of insect pests.

An object of my invention is to make the insecticidal material, when employed either as a spray or dust, a lure for insect larvae through the addition of aliphatic compounds to the poisonous spray or dust.

Another object of my invention is to reduce the concentration of the insecticidal material ordinarily required for the satisfactory control of the insect. The addition of certain aliphatic substances hereinafter set forth to the poisonous spray or dust accomplishes this objective.

A further object of my invention is to reduce the quantity of poisonous spray or dust usually applied to the host plant. This object is attained by combining certain substances hereinafter mentioned with the poisonous spray or dust.

It is well known to entomologists that the codling moth larva, Carpocapsa pomonella L., is a serious economic insect pest. The newly-hatched larva gains entrance into the fruit by chewing through the skin of the host fruit. Usually the skin is not eaten, but instead is cast aside. When the place of larval attack is coated with a poison, the poison is likewise discarded to a considerable extent, thereby greatly increasing the difficulty of killing the larva, and effecting control.

I have found that when certain materials are added to a spray or dust toxic to the codling moth larva, the resulting combination spray or dust is a much more effective insecticide than when the same poisonous compounds are used alone. The presence of certain added substances, intimately mixed with the toxicant, causes the insect to eagerly ingest a lethal dose of the poison.

I have also found that the added materials of my invention, when used alone, are non-toxic to the codling moth larva.

The added substances employed in my invention are found in certain chemical groups such as the carbohydrates, the polyhydroxy alcohols, dibasic hydroxy acids, mixtures thereof, and closely related compounds.

Some typical examples of the results obtained against the codling moth larva are given below:

TABLE 1.—Results of tests

| Spray materials and dosage (pounds-gallons) | Number of plugs | Percentage apple plugs | | |
|---|---|---|---|---|
| | | Wormy | Stung | Clean |
| d-Tartar emetic, 4-100 | 503 | 44.1 | 15.3 | 40.6 |
| d-Tartar emetic, 4-100<br>Brown sugar, 16-100 | 406 | 10.6 | 1.5 | 87.9 |
| l-tartar emetic, 4-100 | 512 | 42.6 | 20.3 | 37.1 |
| l-tartar emetic, 4-100<br>Brown sugar, 16-100 | 406 | 5.9 | 2.5 | 91.6 |
| dl-tartar emetic, 4-100 | 487 | 39.2 | 25.9 | 34.9 |
| dl-tartar emetic, 4-100<br>Brown sugar, 16-100 | 390 | 5.4 | 2.3 | 92.3 |
| Lead arsenate, 4-100<br>Brown sugar, 16-100 | 396 | 4.6 | 2.0 | 93.4 |
| Water | 514 | 93.0 | 0.4 | 6.6 |
| Brown sugar, 16-100 | 98 | 88.8 | 0.0 | 11.2 |
| Lead arsenate, 4-100 | 106 | 13.2 | 15.1 | 71.7 |
| Lead arsenate, 4-100<br>Brown sugar, 8-100 | 110 | 4.5 | 7.3 | 88.2 |
| Lead arsenate, 4-100<br>Brown sugar, 12-100 | 102 | 4.9 | 1.0 | 94.1 |
| Lead arsenate, 2-100<br>Brown sugar, 12-100 | 109 | 13.8 | 1.8 | 84.4 |
| Lead arsenate, 2-100<br>Brown sugar, 16-100 | 105 | 6.7 | 1.9 | 91.4 |
| Water | 105 | 87.6 | 1.0 | 11.4 |

From the foregoing table it will be seen that the effectiveness of d-tartar emetic is greatly increased through the addition of brown sugar. d-Tartar emetic alone gave 40.6% of clean apple plugs, whereas, d-tartar emetic plus brown sugar yielded 87.9% of clean apple plugs. It will be further noted that the same is true in the cases in which l-tartar emetic and dl-tartar emetic were employed. Further, the table shows that in the case of apple plugs sprayed with water alone there was only 6.6% of clean apple plugs. Brown sugar itself was not effective in controlling the codling moth larva as shown by the fact that only 11.2% of the apple plugs sprayed with brown sugar solution were clean. Included in Table 1 is a series of tests in which the quantity of brown sugar was varied. It will be noted in these tests that lead arsenate alone gave 71.7% of clean apple plugs; that lead arsenate with brown sugar at the rate of eight pounds to 100 gallons gave 88.2% of clean apple plugs, and that lead arsenate plus brown sugar at the rate of twelve pounds to 100 gallons yielded 94.1% of clean apple plugs. From this it will be seen that increasing the quantity of brown sugar increases the degree of control of the insect. It will be further noted in Table 1 that a reduced quantity of lead arsenate when combined with brown sugar will give very satisfactory control of the codling moth larva. Lead arsenate at the rate of two pounds to 100 gallons, plus brown sugar, twelve pounds to 100 gallons, gave 84.4% of clean apple plugs. Lead arsenate at the rate of two pounds to 100 gallons, plus brown sugar, 16 pounds to 100 gallons, gave 91.4% of clean apple plugs. These data should be compared with the data for lead arsenate alone at the rate of four pounds to 100 gallons, which show that only 71.7% of clean apple plugs was obtained. A coincidental water check yielded only 11.4% of clean apple plugs. This indicates that in the absence of any insecticide there is only a small percentage of clean apple plugs.

TABLE 2.—*Results of tests*

| Spray materials and dosage (pounds-gallons) | Number of plugs | Percentage apple plugs | | |
|---|---|---|---|---|
| | | Wormy | Stung | Clean |
| Lead arsenate, 4-100 | 419 | 27.2 | 45.6 | 27.2 |
| Lead arsenate, 4-100 Brown sugar, 16-100 | 420 | 11.0 | 19.0 | 70.0 |
| Lead arsenate, 4-100 Sucrose, 16-100 | 424 | 9.7 | 18.9 | 71.4 |
| Lead arsenate, 4-100 Honey, 16-100 | 312 | 19.6 | 24.3 | 56.1 |
| Lead arsenate, 4-100 Corn syrup, 16-100 | 105 | 11.4 | 35.2 | 53.4 |
| Water | 214 | 98.0 | 0.0 | 1.4 |
| Lead arsenate, 4-100 | 310 | 28.7 | 43.9 | 27.4 |
| Ortho-K-oil emulsion, 8-100 | 319 | 85.9 | 2.8 | 11.3 |
| Lead arsenate, 4-100 Ortho-K-oil emulsion, 8-100 | 311 | 23.8 | 18.6 | 57.6 |
| Brown sugar, 16-100 | 215 | 93.4 | 1.4 | 5.1 |
| Lead arsenate, 4-100 Ortho-K-oil emulsion, 8-100 Brown sugar, 16-100 | 316 | 0.9 | 3.5 | 95.6 |
| Water | 316 | 96.2 | 2.2 | 1.6 |
| Water | 109 | 96.4 | 1.8 | 1.8 |
| Lead arsenate, 4-100 | 106 | 35.9 | 41.5 | 22.6 |
| Lead arsenate, 4-100 Sorbitol, 16-100 | 103 | 4.9 | 4.9 | 90.2 |
| Water | 105 | 96.2 | 1.9 | 1.9 |
| Lead arsenate, 4-100 | 107 | 33.7 | 19.6 | 46.7 |
| Lead arsenate, 4-100 Sorbitol (technical) Atlas Powder Co.—Sorban lot #72, 16-100 | 107 | 3.7 | 1.9 | 94.4 |
| Calcium arsenate, 4-100 | 102 | 37.2 | 26.5 | 36.3 |
| Calcium arsenate, 4-100 Brown sugar, 16-100 | 105 | 7.6 | 11.4 | 81.0 |
| Water | 104 | 99.0 | 0.0 | 1.0 |
| Lead arsenate, 4-100 | 101 | 17.8 | 15.9 | 66.3 |
| Lead arsenate, 4-100 Brown sugar, 16-100 | 106 | 1.9 | 3.8 | 94.3 |
| Lead arsenate, 4-100 Molasses, 16-100 | 100 | 3.0 | 0.0 | 97.0 |

From Table 2 the following conclusions may be drawn:

The addition to lead arsenate of brown sugar, sucrose, honey, or corn sirup, greatly increases the effectiveness of lead arsenate. It will be noted from the data that lead arsenate alone gave only 27.2% of clean apple plugs, whereas, the percentage of effectiveness through the addition of any of the above-mentioned materials is very much greater. A coincidental water check gave only 1.4% of clean apple plugs. From Table 2 it will also be observed that the presence of an oil emulsion does not interfere with the increased effectiveness obtained through the use of brown sugar. In this series of tests, lead arsenate alone gave 27.4% of clean apple plugs, whereas, the combination of lead arsenate, ortho-K-oil emulsion, and brown sugar gave 95.6% of clean apple plugs. Oil emulsion was used to render the combination of lead arsenate and brown sugar more adhesive to the foliage and fruit of the host plant. A coincidental check in connection with this series of tests gave only 1.6% of clean apple plugs. The effectiveness of a polyhydroxy alcohol is illustrated in Table 2 through the use of sorbitol combined with lead arsenate. It will be seen from these data that lead arsenate alone gave 22.6% of clean apple plugs; that lead arsenate, plus sorbitol, gave 90.2% of clean apple plugs, and that the coincidental water check yielded 1.8% of clean apple plugs. It will also be noted in this table that the use of a technical sorbitol likewise greatly enhanced the value of lead arsenate as a spray for the codling moth larva. It will be further observed from Table 2 that the effectiveness of calcium arsenate is greatly increased through the use of brown sugar. For example, calcium arsenate alone gave 36.3% of clean apple plugs, calcium arsenate, plus brown sugar, 81% of clean apple plugs, and water alone, 1% of clean apple plugs. Included in Table 2 is another series of tests in which lead arsenate was used alone and gave 66.3% of clean fruit, lead arsenate plus brown sugar 94.3% of clean apple plugs, lead arsenate and molasses 97% of clean apple plugs.

TABLE 3.—*Results of tests*

| Spray materials and dosage (pounds-gallons) | Number of plugs | Percentage apple plugs | | |
|---|---|---|---|---|
| | | Wormy | Stung | Clean |
| Lead arsenate, 4-100 | 104 | 36.5 | 29.8 | 33.7 |
| Lead arsenate, 4-100 Brown sugar, 16-100 | 108 | 3.7 | 4.6 | 91.7 |
| Lead arsenate, 4-100 Molasses, 16-100 | 101 | 10.9 | 3.0 | 86.1 |
| Nicotine bentonite (nicotine 0.025%) | 103 | 77.7 | 5.8 | 16.5 |
| Nicotine bentonite (nicotine 0.025%) Brown sugar, 16-100 | 105 | 10.5 | 1.9 | 87.6 |
| Nicotine bentonite (nicotine 0.025%) Molasses, 16-100 | 107 | 28.0 | 7.5 | 64.5 |
| Lead arsenate, 4-100 | 107 | 38.3 | 33.7 | 28.0 |
| Lead arsenate, 4-100 Galactose, 16-100 | 103 | 29.1 | 22.3 | 48.6 |
| Lead arsenate, 4-100 d-Fructose (levulose), 16-100 | 216 | 17.1 | 7.0 | 75.9 |
| Water | 103 | 97.1 | 1.0 | 1.9 |
| Lead arsenate, 4-100 | 109 | 41.3 | 35.8 | 22.9 |
| Lead arsenate, 4-100 Dextrose, 16-100 | 107 | 31.8 | 16.8 | 51.4 |
| Water | 103 | 99.0 | 0.0 | 1.0 |
| Lead arsenate, 4-100 | 106 | 61.3 | 14.2 | 24.5 |
| Lead arsenate, 4-100 Glycerine, 16-100 | 102 | 45.1 | 13.7 | 41.2 |
| Lead arsenate 4-100 Malic acid 16-100 | 106 | 39.6 | 9.4 | 51.0 |

Table 3 shows the results of the addition of several carbohydrates to lead arsenate. It will be noted from the data appearing in this table that in each instance the addition of the carbohydrate greatly increased the effectiveness of the lead arsenate. Also, it will be noted from the results shown in Table 3 that the addition of brown sugar improved materially the insecticidal control which may be obtained with nicotine bentonite. Glycerine, a polyhydroxy alcohol, when added to lead arsenate increased the effectiveness of this insecticide, as shown in Table 3, from 24.5% of clean apple plugs to 41.2% of clean apple plugs. Included in Table 3 is an example of a dibasic hydroxy acid, namely, malic acid. In the test in which malic acid was used, in combination with lead arsenate, there was 51% of clean apple plugs, whereas, lead arsenate alone gave only 24.5% of clean apple plugs.

TABLE 4.—*Results of tests*

| Spray materials and dosage (pounds-gallons) | Number of plugs | Percentage apple plugs | | |
|---|---|---|---|---|
| | | Wormy | Stung | Clean |
| Phenothiazine, 1-100 | 107 | 56.1 | 12.1 | 31.8 |
| Phenothiazine, 1-100<br>Brown sugar, 16-100 | 104 | 23.1 | 2.9 | 74.0 |
| Phenothiazine, 1-100<br>Molasses, 16-100 | 102 | 17.6 | 4.9 | 77.5 |

In Table 4 is recorded a series of tests with phenothiazine. In one case phenothiazine was used by itself and gave 31.8% of clean apple plugs. When brown sugar was added to phenothiazine, 74% of clean apple plugs was obtained, and, when molasses was added to phenothiazine, the yield of clean plugs was 77.5%.

Having thus described my invention, what I claim for Letters Patent is:

1. An insect larval lure adapted as an adjunct to an insecticide, containing as its essential active ingredient sorbitol admixed with an insecticide.

2. An insect larval lure adapted as an adjunct to an insecticide, containing as its essential active ingredient sorbitol admixed with lead arsenate.

EDOUARD H. SIEGLER.